US012596198B2

(12) United States Patent
Tourian et al.

(10) Patent No.: US 12,596,198 B2
(45) Date of Patent: Apr. 7, 2026

(54) METHOD FOR PROVIDING GNSS-RELEVANT ROUTE INFORMATION

(71) Applicant: Robert Bosch GmbH, Stuttgart (DE)

(72) Inventors: Mohammad Tourian, Stuttgart (DE);
Jens Strobel, Freiberg Am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 270 days.

(21) Appl. No.: 18/464,712

(22) Filed: Sep. 11, 2023

(65) Prior Publication Data

US 2024/0085572 A1    Mar. 14, 2024

(30) Foreign Application Priority Data

Sep. 13, 2022    (DE) ...................... 10 2022 209 521.9

(51) Int. Cl.
*G01S 19/22*        (2010.01)
*G01S 19/21*        (2010.01)
(52) U.S. Cl.
CPC .............. *G01S 19/21* (2013.01); *G01S 19/22* (2013.01)
(58) Field of Classification Search
CPC ........................................................ G01S 19/22
USPC ..................................................... 342/357.59
See application file for complete search history.

(56) References Cited

U.S. PATENT DOCUMENTS

| | | | | |
|---|---|---|---|---|
| 11,163,068 B2 * | 11/2021 | Balog | .................... | G01S 19/215 |
| 2012/0245756 A1 * | 9/2012 | Cooprider | ............. | B60W 50/14 701/1 |
| 2023/0128817 A1 * | 4/2023 | Bennington | ............ | H04L 67/12 342/357.45 |
| 2025/0246312 A1 * | 7/2025 | Belhadi | .................. | G16H 10/20 |

FOREIGN PATENT DOCUMENTS

| | | | | | |
|---|---|---|---|---|---|
| CA | 3205731 A1 | * | 8/2022 | ........... | G01S 19/396 |
| CN | 106291607 B | * | 1/2020 | ............. | G01S 19/22 |
| WO | WO-2022084401 A2 | * | 4/2022 | ........... | G01S 19/215 |
| WO | WO-2022216506 A1 | * | 10/2022 | ......... | G06F 18/2433 |

* cited by examiner

*Primary Examiner* — Harry K Liu
(74) *Attorney, Agent, or Firm* — NORTON ROSE FULBRIGHT US LLP

(57)        ABSTRACT

A method for providing GNSS-relevant route information. The method includes: a) receiving GNSS raw data relating to at least one GNSS satellite signal; b) evaluating the GNSS raw data; c) forming at least one interference indicator for describing at least one interfering influence on the GNSS reception in the area of a geographic position and/or for a route section, taking into account the evaluated GNSS raw data relating to the area or the route section; and d) storing the at least one interference indicator with at least one item of geographic information on the area of the geographic position or the route section.

9 Claims, 2 Drawing Sheets

| receive GNSS raw data a) | evaluate GNSS raw data b) | form inference indicator c) | store inference indicator d) |

110          120          130          140

19

5

9

3

13

15
vehicle
sensor data

16

18

8

GNSS
receiving
unit evaluation
device position
sensor protection
level calc.
unit

4      inference indicator

14

17

20

1

2

5

22

4

23

21

METHOD FOR PROVIDING GNSS-RELEVANT ROUTE INFORMATION

CROSS REFERENCE

The present application claims the benefit under 35 U.S.C. § 119 of German Patent Application No. DE 10 2022 209 521.9 filed on Sep. 13, 2022, which is expressly incorporated herein by reference in its entirety.

FIELD

The present invention relates to a method for providing GNSS-relevant route information. Moreover, a computer program for performing the method, a machine-readable storage medium with the computer program and a system for providing GNSS-relevant route information are provided according to the present invention. The present invention may in particular be used in GNSS-based localization systems for at least partially automated, autonomous or semi-autonomous driving.

BACKGROUND INFORMATION

Using the Global Navigation Satellite System (GNSS), it is possible to make a geospatial position determination at any point on earth. A GNSS satellite orbits the earth and transmits encoded signals that the GNSS receiver uses to calculate the distance or spacing between the receiver and the satellite by estimating the time difference between the time of signal reception and the transmission time. For example, the estimated distances to satellites can be converted by GNSS sensors into an estimate of the position of the receiver if enough satellites are tracked (typically more than 5). Currently, there are more than 130 GNSS satellites orbiting the earth, meaning that at most 65 of them are usually visible on the local horizon.

In recent years, satellite-based position determination has undergone rapid development. In the beginnings of satellite navigation, GNSS receivers had to rely on a single constellation of satellites in orbit, either the American GPS or the Russian GLONASS system, in order to determine their position. Today, with the European Galileo system and the Chinese Beidou system, there are more ready-to-use systems as well as several regional extension systems added to the two original systems. Today, multiconstellation GNSS receivers, which can simultaneously receive signals from all GNSS constellations in orbit, are the norm. As a result, the receivers are able to track a larger number of satellites, even if large portions of the sky are obscured, such as in urban (or actual) street canyons, which increases accuracy and reduces the time for position determination.

The quality of GNSS positioning has benefited for a long time from commercial GNSS correction services. Providers of GNSS correction services generally monitor incoming GNSS signals via a network of base stations with precisely known positions and transmit customized correction information to end users for a fee.

The combination of multiconstellation and multiband receivers with new GNSS correction methods for achieving accuracies in the centimeter range, and all of it at significantly lower operating costs, paves the way for new types of mass market applications for highly accurate positioning in the centimeter range. However, GNSS continues to suffer from the following disadvantages: The receivers should ideally be located within the visibility of the orbiting satellites in order to determine the position. In interiors and tunnels, the services are impaired or even unavailable. With the help of inertial sensors, dead reckoning solutions extend the area of high-precision position determination beyond the range of GNSS signals.

Despite the improvements through the inertial sensors, GNSS/INS-based localization sensors in automated driving systems may suffer from large position errors at least in regions, in particular in urban street canyons where GNSS measurements are typically disrupted by multipath signal propagation. Even on highways, the performance of such GNSS/INS-based localization sensors degrades under bridges, near heavily overgrown areas, large noise barriers, high trucks, etc.

Therefore, according to the present invention, a method and a system are provided that can in particular support GNSS- or GNSS/INS-based localization sensors with advance information in order to be able to overcome the aforementioned disadvantages as well as possible.

SUMMARY

According to the present invention, a method is provided for providing GNSS-relevant route information. According to an example embodiment of the present invention, the method comprises at least the following steps:

a) receiving GNSS raw data relating to at least one GNSS satellite signal, b) evaluating the GNSS raw data, c) forming at least one interference indicator for describing at least one interfering influence on the GNSS reception in the area of a geographic position and/or for a route section, taking into account the evaluated GNSS raw data relating to the area or the route section, d) storing the at least one interference indicator with at least one item of geographic information on the area of the geographic position or the route section.

For example, steps a), b), c) and d) may be performed at least once and/or repeatedly in the given order in order to perform the method. Furthermore, steps a), b), c) and d), in particular steps b) and c) may be performed at least partially in parallel or simultaneously. Step a) or steps a) and b) may in particular be performed on-board or by means of a GNSS evaluation device of a vehicle. Steps b), c) and/or d), in particular steps c) and d), may likewise be performed on-board and/or at least partially off-board, e.g., by a superordinate management device capable of receiving data from several vehicles.

The GNSS-relevant route information may, for example, be one or more items of GNSS availability information in the area of a geographic position and/or at a route section. The route information may, for example, contain a measure of the availability, grade, and/or quality of the GNSS reception in the area of a geographic position and/or at a route section. The GNSS-relevant route information may, for example, be provided in the form of a digital map (2D or 3D) and/or in a database for providing geographic information. Alternatively, or cumulatively, the GNSS-relevant route information may, for example, be provided as an additional layer of a (an existing) digital feature map (HD map). Alternatively, or cumulatively, the GNSS-relevant route information may, for example, be provided in an availability map and/or used to provide an availability map. In particular, the method may be a method for providing a digital map for describing GNSS-relevant route information.

In step a), GNSS raw data relating to at least one GNSS satellite signal are received. According to an example embodiment of the present invention, the GNSS raw data may, for example, be ascertained and output by a GNSS receiving unit of a system, such as a localization system or a system for providing GNSS-relevant route information. For this purpose, the GNSS receiving unit may, for example, receive the GNSS signals from one or more GNSS satellites. The GNSS raw data are thus (raw) data that are ascertained directly from the satellite signals and are in particular not yet (pre-) processed by another data processing device. In particular, the raw data are not position data, which are generally first ascertained by a position sensor or a localization filter, which is significantly downstream of the GNSS receiving unit.

In step b), the GNSS raw data are evaluated. According to an example embodiment of the present invention, the GNSS raw data may, for example, be evaluated by an evaluation unit of a (the) system, such as a localization system or a system for providing GNSS-relevant route information. In the evaluation, the GNSS raw data may, for example, be examined with regard to GNSS-reception-relevant parameters, such as signal quality, signal strength, noise ratio, etc. The GNSS-reception-relevant parameters may, for example, be suitable in this context for describing the grade and/or quality of the GNSS reception.

In step c), at least one interference indicator for describing at least one interfering influence on the GNSS reception in the area of a geographic position and/or for a route section is formed, taking into account the evaluated GNSS raw data relating to the area or the route section. According to an example embodiment of the present invention, the interfering influence is generally (negative) influences on the signals or the signal propagation of GNSS signals. Corresponding interfering influences may, for example, be multipath propagations of signals and/or signal reflections or objects on which corresponding signal propagation interferences can occur. Furthermore, the interfering influence may be a signal delay or signal deflection, as it can occur, for example, in the atmosphere, in particular in the ionosphere.

For example, according to an example embodiment of the present invention, the at least one interference indicator may comprise or describe one or more of the following indicators or parameters:

multipath propagation indicator
GNSS signal strength
indicators for high-frequency interferences
number of satellites
horizontal dilution of precision (HDOP)
satellite distribution with respect to vehicle trajectory
continuity of signal reception In step d), the at least one interference indicator with at least one item of geographic information on the area of the geographic position or the route section is stored. According to an example embodiment of the present invention, storing may, for example, take place on-board or off-board, e.g., in a database, a server and/or in the cloud. Storing may preferably take place such that a database for providing GNSS-relevant route information is thereby generated and/or added to and/or updated. Storing may furthermore preferably take place such that a database for providing a digital map for describing GNSS-relevant route information is thereby generated and/or added to and/or updated. The at least one interference indicator may be stored in a particularly advantageous manner in order to be able to be provided or in order to be provided as advance information on the expected GNSS reception in the area of the geographic position or the route section.

According to an advantageous embodiment of the present invention, it is provided that the GNSS raw data describe the data that are output directly by a GNSS receiving unit. The GNSS receiving unit may, for example, be one or more GNSS receivers that receive the GNSS satellite signal directly. A corresponding GNSS receiving unit is also generally referred to as a so-called measurement engine. The GNSS raw data are in particular data that have not yet been processed for ascertaining the position; they are in particular not position data. For example, the GNSS raw data may serve to be supplied to a later position data ascertainment.

According to a further advantageous embodiment of the present invention, it is provided that a multiplicity of measurement runs is performed with measurement vehicles in order to receive the GNSS raw data. The measurement vehicles are in particular motor vehicles, such as automobiles. The measurement vehicles can preferably be configured for at least partially automated or autonomous driving operation. The measurement vehicles may in particular be equipped with a two-frequency signal receiver for receiving GNSS signals at two different frequencies. This can advantageously contribute to the measurement vehicles being able to also simultaneously perform a reference measurement in order to thus infer and/or calculate signal propagation interferences. According to a further advantageous embodiment of the present invention, it is provided that, in the evaluation of the received GNSS raw data, at least one quality indicator is ascertained on the basis of the GNSS raw data, and wherein the quality indicator is taken into account in the formation of the at least one interference indicator. The quality indicator is preferably ascertained on-board so that it can be decided on the basis of the quality indicator whether the GNSS raw data are to be forwarded to an off-board device or to an off-board management system for ascertaining the interference indicator. This can advantageously contribute to being able to conserve amounts of data required for transmission to the external management system that would otherwise be required for the transmission of all GNSS raw data. Thus, the quality indicator can, for example, be taken into account in the formation of the at least one interference indicator in such a way that it is decided, depending on the value or information of the quality indicator, whether the relevant GNSS raw data are to be transmitted and thus be taken into account at all.

For example, the at least one quality indicator may comprise or describe one or more of the following indicators or parameters:

multipath risk indicator: Such an indicator may, for example, be created by comparing the absolute pseudorange residuals with the position accuracy and/or by calculating the residuals scaled with the estimated standard deviation.

indicator(s) for high-frequency interferences: These can, for example, be obtained by ascertaining indicators from the CNO variation and/or the tracking loop, or also from evaluating the analog input gain in the high-frequency signal receiving path.

According to a further advantageous embodiment of the present invention, it is provided that the formation of the at least one interference indicator is performed by a superordinate and/or off-board management system. For example, the management system may comprise one or more servers. Furthermore, the management system may comprise a cloud or be provided in the manner of a cloud.

According to a further advantageous embodiment of the present invention, it is provided that the at least one interference indicator comprises a multipath propagation indicator that describes a probability measure of the occurrence of multipath signal propagation in the area of the geographic position or the route section. The interference indicator or multipath propagation indicator may, for example, describe a multipath risk measure in the area of the geographic position or the route section. For example, a multipath risk measure that describes a probability measure of the occurrence of multipath propagations in the area of the geographic position or the route section, such as a particular section of a highway or road, may be ascertained from a multiplicity of driving hours with measurement vehicles.

According to a further advantageous embodiment of the present invention, it is provided that the at least one interference indicator comprises an availability indicator and/or confidence indicator formed taking into account a probability measure of the occurrence of multipath signal propagation in the area or route section. The availability indicator can advantageously contribute to generating an availability map as a form of provision. The confidence indicator can advantageously be used in ascertaining a measure of confidence or reliability of a GNSS-based localization solution. The measure of confidence or reliability may, for example, advantageously be a so-called protection level known in the relevant field.

For example, an availability map along with a confidence measure or measure of confidence or reliability of a GNSS-based localization solution can be ascertained from a multiplicity of driving hours with measurement vehicles. Thus, a probability measure of the availability of a GNSS system on highways and roads can be described in a particularly advantageous manner. The availability map can be created using an algorithm based on the average number of available satellites, the available protection level, and the obtained position, speed, and orientation errors of the reference system.

In a further aspect of the present invention, a computer program for performing a method presented herein is provided. In other words, this aspect relates in particular to a computer program (product) comprising instructions which, when the program is executed by a computer, cause the latter to perform a method described herein.

Provided according to a further aspect of the present invention is a machine-readable storage medium on which the computer program provided here is stored or saved. The machine-readable storage medium is routinely a computer-readable data carrier.

According to a further aspect of the present invention, a system for providing GNSS-relevant route information is specified, wherein the system is configured to perform a method described herein. The system may, for example, be provided and configured for a (motor) vehicle, such as an automobile. The vehicle may, for example, be configured for at least partially automated or autonomous driving operation. The system may, for example, comprise a computer and/or a controller that can execute instructions to execute the method. For this purpose, the computer or the controller can, for example, execute the specified computer program. For example, the computer or the controller may access the specified storage medium in order to be able to execute the computer program.

According to an example embodiment of the present invention, the system may, for example, comprise an on-board GNSS evaluation device, which can directly read and evaluate the GNSS raw data or the output of the GNSS receiver or of the GNSS receiving unit (the measurement engine). For example, off-board, the system may comprise at least one server and/or a database, preferably in the cloud. The GNSS evaluation device can in particular be provided and configured to perform steps a) and b). The server or the cloud can in particular be provided and configured to perform steps c) and d). The system can, for example, (alternatively or cumulatively) be a component of a motion and position sensor, which, in particular, can be arrangeable or arranged in or on a vehicle, or can be connected to such a sensor for information exchange.

The details, features and advantageous embodiments of the present invention discussed in connection with the method may also occur in the computer program presented herein and/or in the storage medium and/or in the system, and vice versa. In this respect, reference is made in full to the statements there regarding the more detailed characterization of the features.

The solution presented here and the technical environment thereof are explained in greater detail hereinafter with reference to the figures. It should be noted that the present invention is not to be limited by the exemplary embodiments shown. In particular, unless explicitly shown otherwise, it is also possible to extract partial aspects of the facts explained in the figures and to combine them with other components and/or findings from other figures and/or the present description.

DETAILED DESCRIPTION OF EXAMPLE EMBODIMENTS

Figure 1:
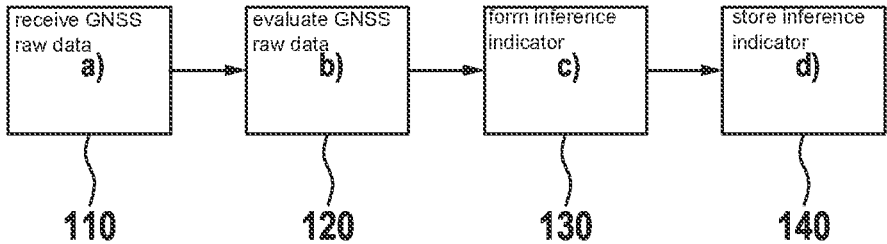
FIG. 1 shows an exemplary sequence of a method according to an example embodiment of the present invention.

FIG. 1 schematically shows an exemplary sequence of the method presented herein. The method serves for providing GNSS-relevant route information. The order of steps a), b), c) and d) shown with blocks 110, 120, 130 and 140 is exemplary and can, for example, be run through at least once in the shown order in order to perform the method.

In block 110, according to step a), GNSS raw data relating to at least one GNSS satellite signal are received. In block 120, according to step b), the GNSS raw data are evaluated. In block 130, according to step c), at least one interference indicator for describing at least one interfering influence on the GNSS reception in the area of a geographic position and/or for a route section is formed, taking into account the evaluated GNSS raw data relating to the area or the route section. In block 140, according to step d), the at least one interference indicator with at least one item of geographic information on the area of the geographic position or the route section is stored.

Figure 2:
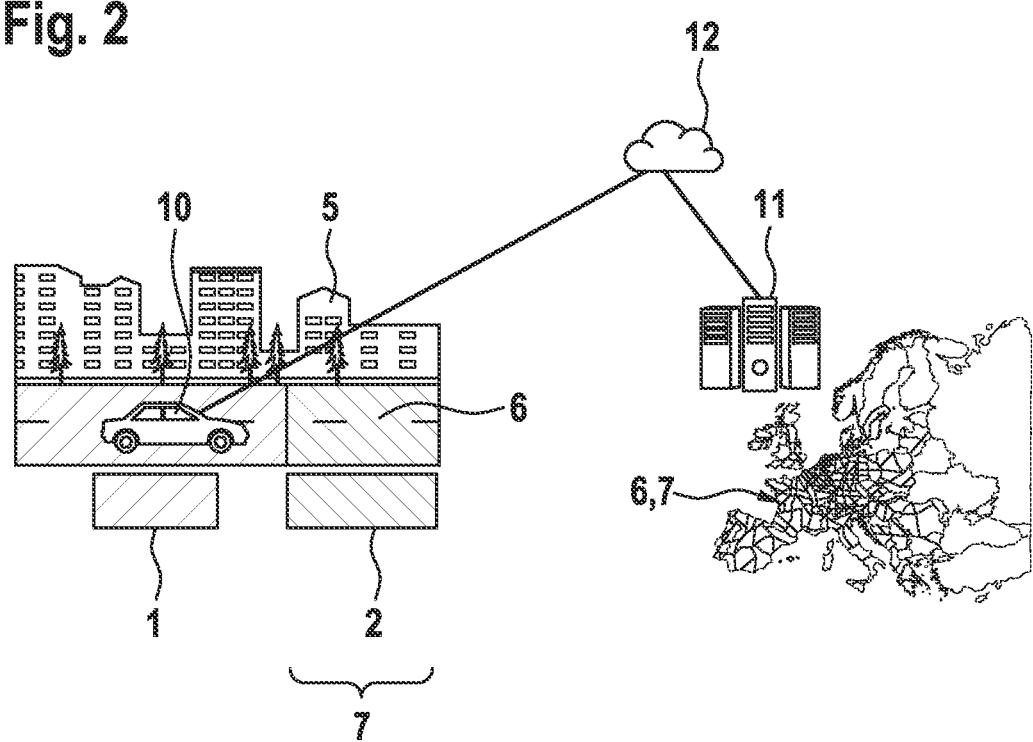
FIG. 2 shows an exemplary illustration of an application of the method described herein, according to the present invention.

FIG. 2 schematically shows an exemplary illustration of an application of the method described herein. In this context, FIG. 2 shows, by way of example, that a multiplicity of measurement runs can be performed with measurement vehicles 10 in order to receive the GNSS raw data. For example, the measurement vehicles 10 can each be equipped with a two-frequency signal receiver for receiving GNSS signals at two different frequencies, in order to be able to advantageously perform GNSS measurements and reference measurements simultaneously. In particular, as a result of the reference measurements, calculations can be performed that advantageously allow ascertaining a possible multipath signal propagation, which may occur, for example, through reflections on objects (here, for example, houses) in the vicinity of the vehicle 10.

On this basis, a probability measure of the occurrence of multipath signal propagation in the area of a geographic position 6 and/or at a route section 7 may, for example, be advantageously determined. For this purpose, the measurement vehicle 10 can advantageously transmit all recorded GNSS raw data or selected GNSS raw data to a cloud 12, which is realized, for example, on one or more servers 11. A management system 11, 12 formed therewith can advantageously be configured to ascertain at least one interference indicator for describing at least one interfering influence 5 (here, for example, the multipath signal propagation through signal reflection on houses) on the GNSS reception in the area of the geographic position 6 and/or for the route section 7, taking into account the evaluated GNSS raw data for the area or the route section 7.

On the one hand, this represents an example of the fact that and, where applicable, how the formation of the at least one interference indicator can be performed by a superordinate and/or off-board management system 11, 12. On the other hand, this represents an example of the fact that and, where applicable, how the at least one interference indicator can comprise a multipath propagation indicator that can describe a probability measure of the occurrence of multipath signal propagation in the area of the geographic position 6 or the route section 7.

Furthermore, in the evaluation of the received GNSS raw data, at least one quality indicator can be ascertained on the basis of the GNSS raw data. The quality indicator can be taken into account in the formation of the at least one interference indicator. For example, the quality indicator can contribute to deciding whether or not GNSS raw data are to be transmitted to the off-board management system 11, 12. Thus, amounts of data for transmission can advantageously be conserved, which would otherwise be required for the transmission of all GNSS raw data.

Alternatively, or cumulatively, the at least one interference indicator may comprise an availability indicator and/or confidence indicator formed taking into account a probability measure of the occurrence of multipath signal propagation in the area or route section. The confidence indicator can in particular be suitable for being able to contribute to ascertaining a protection level as appropriate as possible. The protection level generally describes a range in which the true localization solution is actually located with a predeterminable minimum probability.

The at least one interference indicator can advantageously be used to provide GNSS-relevant route information 1, 2 to, for example, other GNSS users, such as other road users or vehicles, e.g., via the cloud 12. FIG. 2 illustrates, by way of example, that a first, in particular positive, item of GNSS-relevant route information 1 is provided for a part of a road, whereas a second, in particular negative, item of GNSS-relevant route information 2 is provided for a subsequent part of the road or route section 7. The second, negative item of GNSS-relevant route information 2 may, for example, describe the advance information that reduced or poor GNSS reception is to be expected in the route section 7 or in the area of the position 6.

Figures 3, 4:
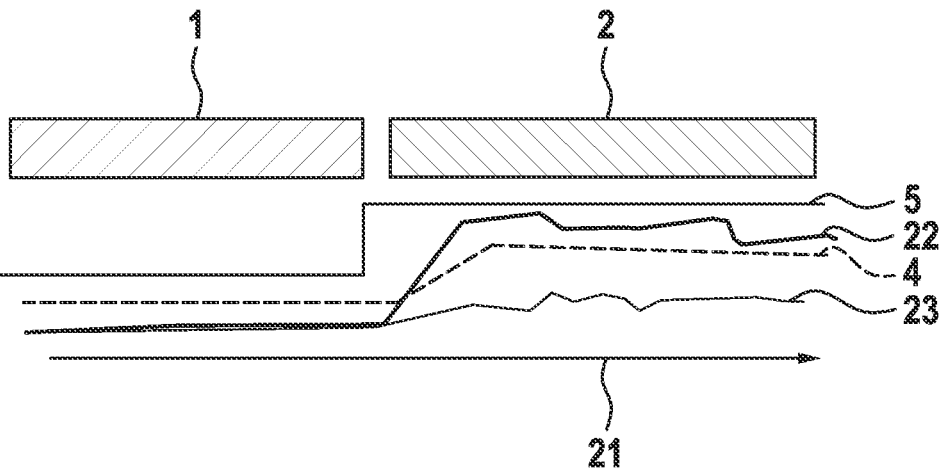
FIG. 3 shows an example of a localization device that can contribute to performing the method, according to the present invention.
FIG. 4 shows an exemplary illustration of parameter profiles for explaining advantages of the method, according to the present invention.

FIG. 3 schematically shows an example of a localization device that can contribute to performing the method. The localization device 20 comprises a GNSS receiving unit 9

(generally also referred to as a "measurement engine"), which receives GNSS satellite signals 8 directly and ascertains the GNSS raw data 3. The GNSS raw data 3 are evaluated in an evaluation device 13 of the localization device 20. The evaluation device 13, in particular together with the management system 11, 12, can represent a part of a system 11, 12, 13 for providing GNSS-relevant route information 1, 2 that is configured to perform a method described herein.

This is also an example of the fact that and, where applicable, how the GNSS raw data 3 can describe the data that are output directly by a GNSS receiving unit 9.

In one exemplary embodiment, the evaluation device 13 can, on the one hand, ascertain the at least one interference indicator 4, in particular in cases in which it is to be ascertained on-board. The evaluation device 13 usually transmits GNSS data evaluated from the GNSS raw data 3 and, where applicable, pre-processed, to a position sensor 14 of the localization device 20. A localization filter, such as a Kalman filter, can be realized in the position sensor 14. Moreover, vehicle sensor data 15 from, for example, wheel speed sensors, acceleration sensors, or the like, may also be provided to the position sensor 14, for example for an inertial navigation solution or inertial solution. Thus, for example, the position sensor 14 may be a combined GNSS/INS sensor.

The position sensor 14 may ascertain a fused position solution 16 from the GNSS data and the inertial data. Furthermore, the localization device 20 may comprise a protection level calculation unit 17, which can ascertain and output the protection level 18 to the position solution 16. In particular, the representation of FIG. 2 is to be used to illustrate that the method relates to the front signal processing portion 19 of the GNSS localization. In particular, the GNSS-relevant route information 1, 2 or the interference indicators 4 are not ascertained on the basis of position data. Rather, the raw data ascertained directly from the GNSS signal are used here, which are significantly closer to the physical interfering influences to be taken into account and are in particular less influenced by the algorithms used for ascertaining the position.

FIG. 4 schematically shows an exemplary illustration of parameter profiles for explaining advantages of the method. In FIG. 4, the profiles of a first position error 22 and of a second position error 23 are in particular plotted over the time 21. The first position error 22 describes an error of the position solution 16, as it can arise, for example, without taking into account advance information relating to the GNSS reception, which can advantageously be provided by the method described herein. It can be seen that the first position error 22 clearly increases after an interference 5 occurs, which is assumed to be binary here by way of example.

By the method described herein, an interference indicator 4 can advantageously be provided as advance information on the expected GNSS reception. FIG. 4 shows by way of example that the latter can likewise increase in the area in which interference 5 is present. The interference indicator 4 may be taken into account in ascertaining the localization solution 16, for example, by downweighting or completely neglecting the influence of the GNSS data on ascertaining the position. Accordingly, the use of the method can advantageously result in a second position error 23, which may also be lower in the area of the interference 5 than the first position error 22 is.

In an advantageous embodiment variant, an assistance system 11, 12, 13 can be specified here that provides advance route information 1, 2 on the expected GNSS reception or the expected GNSS reception quality on the basis of a multiplicity of driving hours. The assistance system may rely on a database 11, 12 of roads and paths, which in one embodiment variant can represent the performance of a GNSS/INS-based localization sensor and its possible availability and boundary of uncertainty. Such a database 11, 12 can be generated from a multiplicity of driving hours and the evaluation of GNSS raw data 3, which are otherwise ascertained for a GNSS/INS-based sensor 14. Such data can be transmitted online from a cloud server 11, 12 to an automated driving system.

The assistance system can in particular rely on GNSS-relevant advance route information 1, 2. The system can comprise a database in a cloud server that can be used both online and offline. Such advance information can be obtained through a multiplicity of driving hours with a GNSS-based localization sensor, wherein the test runs may be equipped with a reference system that can be connected to a precise antenna. From a multiplicity of driving hours, an availability map can be generated along with a confidence measure which can describe a probability measure of the availability of a GNSS system on highways and roads. Moreover, the assistance system may benefit from crowd-sourcing information about highways and roads without a previous test run being available. The advance information can be updated after new runs on certain highways and roads.

In an advantageous embodiment variant, an assistance system 11, 12, 13 can thus be specified here for the localization of automated driving systems 10 for providing advance route information 1, 2 relevant to GNSS-based localizations. The system can comprise a database 12 in a cloud server 11 that can be used both online and offline. For example, the advance information may be obtained by a multiplicity of hours of previous runs with a GNSS/INS-based localization sensor. Here, performance measurements of a GNSS/INS-based sensor can be obtained by previous runs with a GNSS reference system. The reference system can be connected to an advantageously precise antenna.

Furthermore, in an advantageous embodiment variant, a quality map can be generated that describes a probability measure of the availability of a GNSS system on highways and roads. In this case, for highways and roads on which no measurement runs are available, the data can be collected by crowdsourcing. The transmission between server 11 and end-user 10 can advantageously be encrypted. Furthermore, the advance information can be updated after new runs have taken place on certain highways and roads. A confidence measure, such as a protection level, for the advance information provided can also be provided.

Furthermore, the quality map can be obtained by an algorithm based on the average number of available satellites, one or the multipath propagation indicator, an available protection level, and obtained position, speed, and orientation errors from the reference system. Quality information, for example for realizing the interference indicator 4, can be stored in the quality map. The quality information can comprise the availability of GNSS satellites, the possible position, speed and orientation error, the possible protection level and the availability of SSR correction data.

What is claimed is:

1. A method for updating an availability map providing GNSS-relevant route information, comprising the following steps:
   a) receiving GNSS raw data relating to at least one GNSS satellite signal;
   b) evaluating the GNSS raw data;
   c) forming at least one interference indicator for describing at least one interfering influence on the GNSS reception in an area of a geographic position and/or for a route section, taking into account the evaluated GNSS raw data relating to the area of the geographic position or the route section;
   d) storing the at least one interference indicator with at least one item of geographic information on the area of the geographic position or on the route section; and
   e) updating the availability map based on the at least one interference indicator and the at least one item of geographic information.

2. The method according to claim 1, wherein the GNSS raw data describes data that are output directly by a GNSS receiving unit.

3. The method according to claim 1, wherein a multiplicity of measurement runs is performed with measurement vehicles in order to receive the GNSS raw data.

4. The method according to claim 1, wherein, in the evaluation of the received GNSS raw data, at least one quality indicator is ascertained based on the GNSS raw data, and wherein the quality indicator is taken into account in the formation of the at least one interference indicator.

5. The method according to claim 1, wherein the formation of the at least one interference indicator is performed by a superordinate and/or off-board management system.

6. The method according to claim 1, wherein the at least one interference indicator includes a multipath propagation indicator describing a probability measure of an occurrence of multipath signal propagation in the area of the geographic position or the route section.

7. The method according to claim 1, wherein the at least one interference indicator includes an availability indicator and/or confidence indicator formed taking into account a probability measure of the occurrence of multipath signal propagation in the area of the geographic position or route section.

8. A non-transitory machine-readable storage medium on which is stored a computer program for updating an availability map providing GNSS-relevant route information, the computer program, when executed by a computer, causing the computer to perform the following steps:
   a) receiving GNSS raw data relating to at least one GNSS satellite signal;
   b) evaluating the GNSS raw data;
   c) forming at least one interference indicator for describing at least one interfering influence on the GNSS reception in an area of a geographic position and/or for a route section, taking into account the evaluated GNSS raw data relating to the area of the geographic position or the route section;
   d) storing the at least one interference indicator with at least one item of geographic information on the area of the geographic position or on the route section; and
   e) updating the availability map based on the at least one interference indicator and the at least one item of geographic information.

9. A system configured to update an availability map providing GNSS-relevant route information, the system configured to:
   a) receive GNSS raw data relating to at least one GNSS satellite signal;
   b) evaluate the GNSS raw data;
   c) form at least one interference indicator for describing at least one interfering influence on the GNSS reception in an area of a geographic position and/or for a route section, taking into account the evaluated GNSS raw data relating to the area of the geographic position or the route section;

d) store the at least one interference indicator with at least one item of geographic information on the area of the geographic position or on the route section; and e) update the availability map based on the at least one interference indicator and the at least one item of geographic information.

\* \* \* \* \*